Nov. 2, 1943.          J. E. KLINE          2,333,256
METALWORKING MACHINE
Filed May 3, 1940          2 Sheets-Sheet 1

INVENTOR
John E. Kline.
BY Harness, Dickey & Pierce.
ATTORNEYS.

Nov. 2, 1943.  J. E. KLINE  2,333,256
METALWORKING MACHINE
Filed May 3, 1940  2 Sheets-Sheet 2
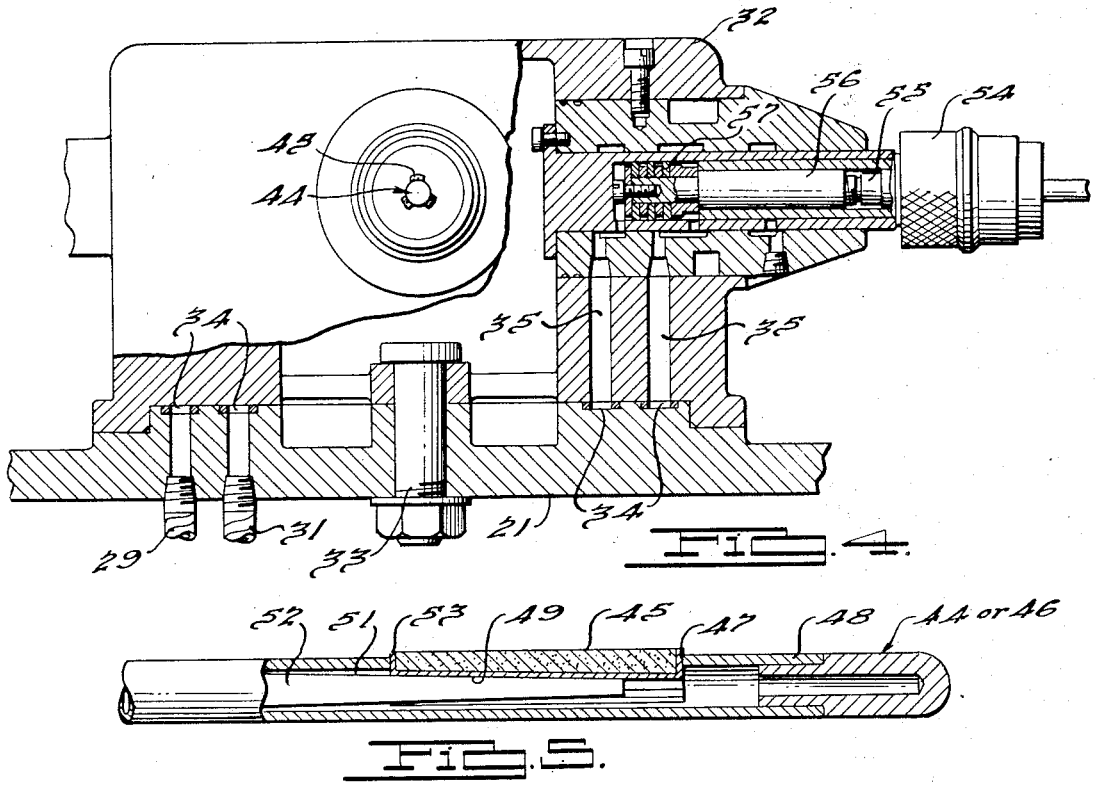
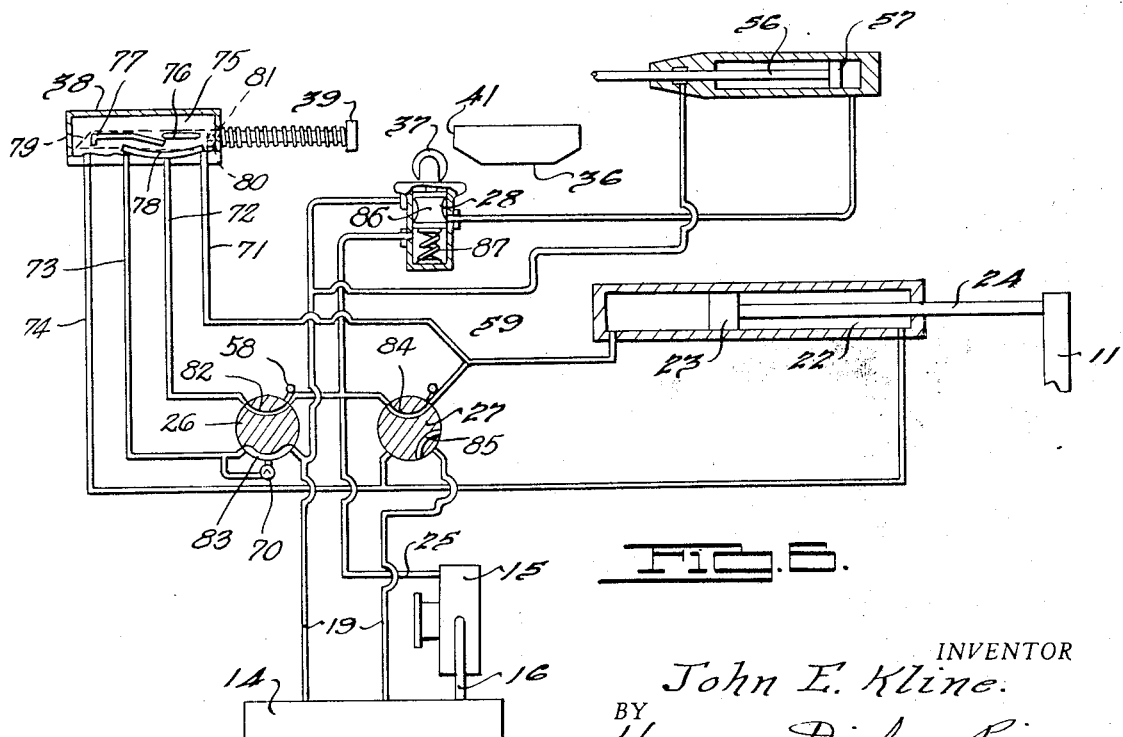
INVENTOR
John E. Kline.
BY Harness, Dickey & Pierce.
ATTORNEYS.

Patented Nov. 2, 1943

2,333,256

UNITED STATES PATENT OFFICE 2,333,256

METALWORKING MACHINE

John E. Kline, Grosse Pointe, Mich., assignor to Micromatic Hone Corporation, Detroit, Mich., a corporation of Michigan Application May 3, 1940, Serial No. 333,192

3 Claims. (Cl. 29—42)

My invention relates to metal working machinery, and particularly to a turret type of machine which operates on internal or external cylindrical surfaces for cutting and thereafter grinding the surfaces in a single chucking of the workpiece.

In the art it has been the practice to employ separate machines for rough cutting, rough honing, and for finish honing cylindrical surfaces. Considerable time and labor was wasted in moving the workpieces from one machine to the other, and increased cost of equipment, and floor space resulted from this practice. In the present machine, which is illustrated as operating on the internal surface of the workpiece, a chuck is provided for rotating the workpiece and a turret type of head carries tools which operate on the surface seriatim. While I have illustrated a machine for operating on the internal surface of cylindrical workpieces, it is to be understood that the external cylindrical surfaces of the workpieces may be machined in a similar manner by employing external instead of the internal types of tools herein illustrated and described.

The machine embodies a bed having a work supporting head in which a shaft is journalled and driven in rotation from suitable driving means. A chuck is mounted on the end of the shaft which engages the workpiece to have the external or internal surfaces thereof exposed for machine operations. The bed also carries a slide on which the turret head is mounted and means are provided for advancing and retracting the slide toward and from the workpiece. A boring tool, a rough honing tool, and a finish honing tool is illustrated as being mounted in the turret head. Fluid means are provided for actuating the slide and valves control the movement of the tools relative to the workpiece and the expansion and retraction of the abrading stones of the honing tools.

The valves provided in the fluid circuit advance the slide at two different speeds, one for advancing the tools in position and for reciprocating and honing tools, the other to slowly advance the cutting tool across the surface of the workpiece. A reservoir is provided in the base of the machine in which the fluid is stored and from which it is pumped to the various fluid circuits above-mentioned. A relief valve is utilized for regulating the pressure on the fluid, which may vary depending upon the size of the workpiece and tool.

Accordingly, the main objects of my invention are: to provide a method of machining which embodies the rotation of the workpiece and the feeding of various tools seriatim over the surface of the workpiece; to provide a machine for engaging and rotating the workpiece, having a turret type of head in which a plurality of tools are mounted and having control means for feeding the tools over the surface of a workpiece to perform a series of operations thereon; to provide a fluid circuit for a slide of a machine which controls the movement of a cutting tool to rapidly advance the tool in position to thereafter slowly feed the tool across the surface of a workpiece; to provide a machine having a turret type of head on which a plurality of honing tools are mounted, disposed to be reciprocated relative to the surface of a workpiece by fluid means which also controls the expansion and retraction of the abrading elements; and in general, to provide a machine for performing a series of operations on a workpiece, which is simple in construction, positive in operation, and economical of manufacture.

Other objects and features of novelty of my invention will be either specifically pointed out or will become apparent when referring, for a better understanding of my invention, to the following description taken in conjunction with the accompanying drawings, wherein:

Fig. 4 is a sectional view of the structure illustrated in Fig. 2, taken on the line 4—4 thereof;

Fig. 5 is an enlarged sectional view of the honing tool illustrated in Figs. 1 and 2; and, Fig. 6 is a diagrammatical view of the fluid control mechanism employed on the machine illustrated in Fig. 1.

Figure 1:
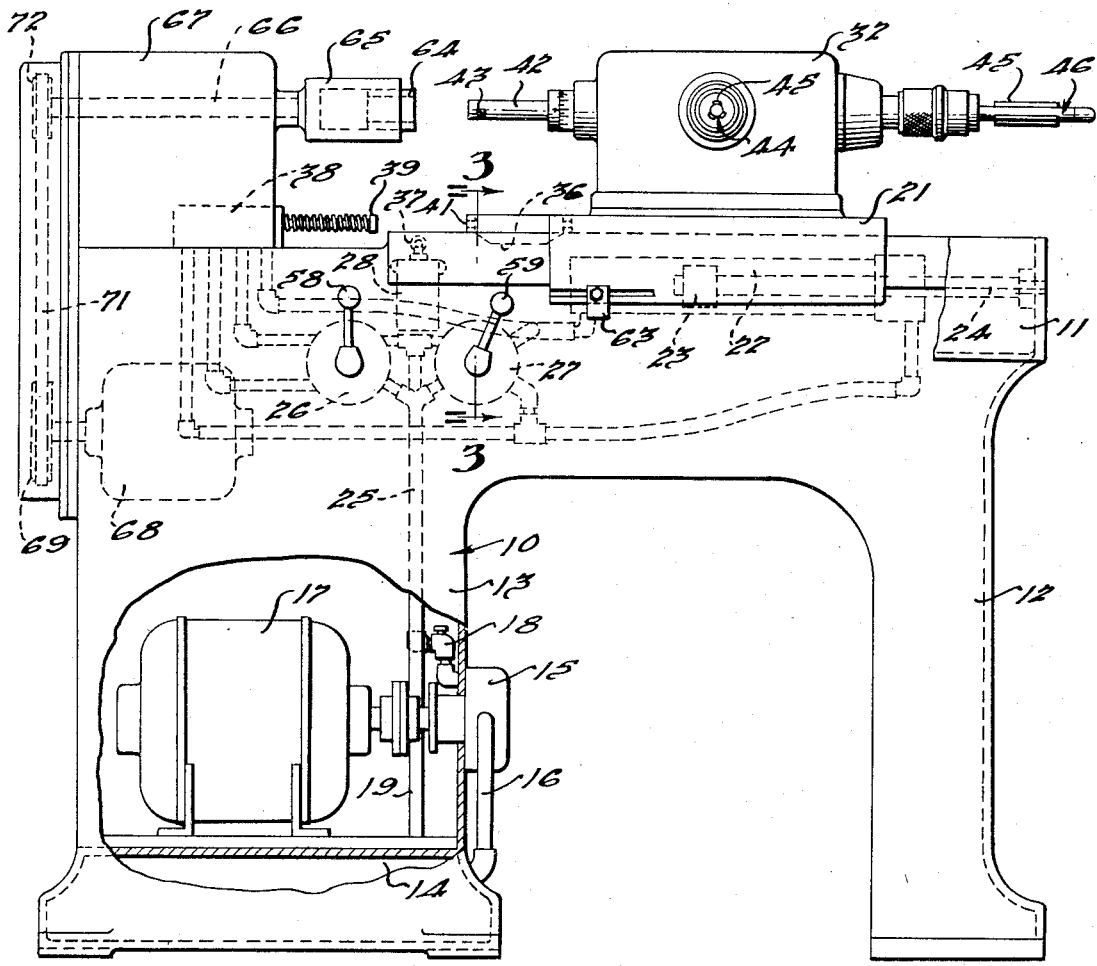
Figure 1 is a broken plan view of a machine for cutting and honing the surface of a cylindrical workpiece, embodying features of my invention.
Figure 2:
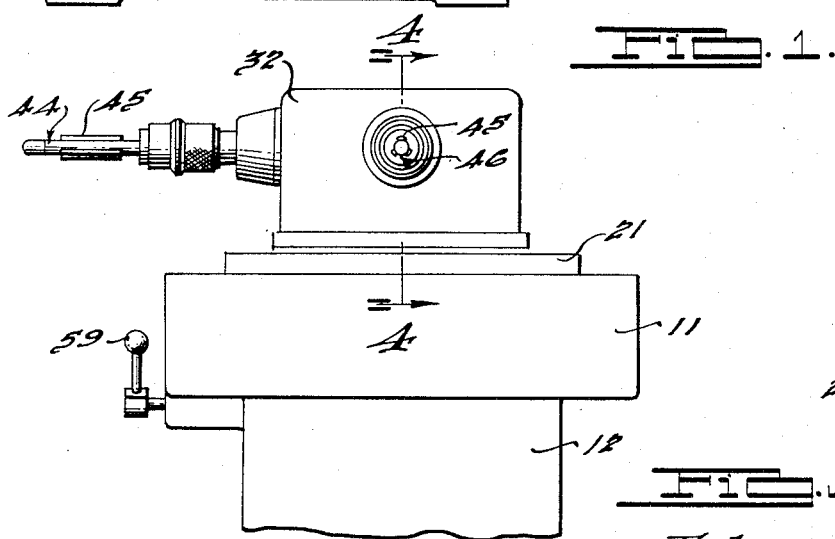
Fig. 2 is a broken end view of the machine illustrated in Fig. 1.

In Fig. 1, I have illustrated a machine having a base 10 embodying a bed 11 mounted on legs 12 and 13. At the base of the leg 13 a reservoir or sump 14 is provided for retaining the fluid for the system, which fluid is preferably oil. A pump 15 is connected to the sump by a conduit 16 and is driven by a motor 17. A relief valve 18, connected on the pressure side of the pump, is regulated to control the pressure on the fluid system. A conduit 19 by-passes the fluid from the relief valve and the system back to the reservoir 14.

The bed 11 of the machine is provided with ways, not herein specifically illustrated since any type of way well-known in the art may be used for supporting a slide 21 which reciprocates on the bed. The slide is provided with a cylinder 22 in which a piston 23 is supported on a fixed shaft 24 secured to the righthand end of the bed 11, as illustrated in the figure. Fluid is delivered from the relief valve 18 under predetermined pressure from a conduit 25 to valves 27 and 26 and to a valve 28. The fluid from the valve 28 passes through flexible conduits 29 and 31 of the slide, as illustrated in Fig. 4, to a turret head 32 mounted on a pin 33 for rotational movement. The fluid passes through annular orifices 34 in the slide 21 through apertures 35 in the head to the honing tools. The fluid delivered in this manner is employed for expanding and retracting the abrading stones of the tool, as described more fully hereinafter.

A cam 36 on the slide 21 is disposed in position to engage a roller 37 on the valve 28 for operating the valve to reverse the flow of fluid to the abrasive tool and cause the abrasive stones to expand. This occurs after the tool has been inserted within the bore of the workpiece being machined. Connected to the valves 26 and 27 is a four-way valve 38 having a spring-pressed plunger 39 disposed in the path of movement of the cam end 41 of the slide 21. When the honing operation is being performed the slide is reciprocated through the actuation of the plunger 39 by the cam end 41 reversing the flow of fluid delivered to the ends of the cylinder 22 of the slide.

The head 32 is provided on one side with a boring tool 42 having a cutting tool 43 which machines the surface as the tool is slowly advanced within the workpiece. On the adjacent side of the head a honing tool 44 is provided having roughing stones 45 for performing a rough honing operation following the boring operation. On the next adjacent face of the head 32 a honing tool 46 is provided having stones 45 of a finer grade of abrasive material for the purpose of performing a finishing operation following the rough honing operation by the hone 44.

As illustrated in Fig. 5, the stones 45 are disposed in a slot 47 in the body 48 of the tool and having a sloping rear wall 49 which abuts against the sloping surfaces 51 provided on a longitudinally movable central rod 52. The abrasive stones 45 are preferably encased in a metal sheath 53 to provide strength and a smooth surface to engage the sloping surface 51 of the rod 52. The rod and tool are attached to an adjusting head 54 through the rotation of which the stones may be adjusted to a desirable diameter. A shaft 55 of the head is connected to an extension 56 of a piston 57 by which the rod 52 is further manipulated to expand the abrasive stones 45 radially or to move out of contact therewith to permit the stones to retract when the fluid is reversed from one side of the piston 57 to the other. A more detailed description and illustration of the adjusting head 54 may be found in my copending application, Serial No. 274,890, filed May 22, 1939, and assigned to the assignee of the present invention.

Figure 3:
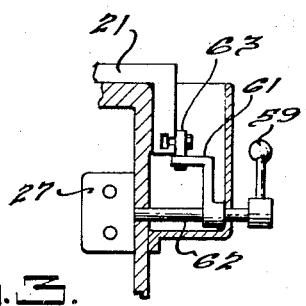
Fig. 3 is a sectional view of the structure illustrated in Fig. 1, taken on the line 3—3 thereof.

For a complete understanding of the operation of the device reference may be had to the diagrammatic view of the control system for the various inter-related movable parts of the machine which will now be described. The valves 26 and 27 are provided with operating levers 58 and 59 by which the valves are manually adjusted. The valve lever 59 has a trip lever 61 on the valve shaft 62 as illustrated in Fig. 3, positioned to be contacted by an operating arm 63 adjustably mounted on the side of the slide 21. The workpiece 64 is mounted in the chuck 65 on a shaft 66 journaled in a stationary head 67. The shaft and workpiece are rotated by a motor 68 driving a pulley 69, a belt 71, and a pulley 72 on the shaft.

The valves 26 and 27 are so related that when both are moved in a clockwise direction pressure is delivered to the cylinder 22 to advance the slide at the maximum speed toward the workpiece. When substantially in position to perform a boring operation, the valve operating handle 58 on valve 26 is moved to neutral position to cause the fluid on the opposite side of the piston 23 from that receiving the fluid to pass through a needle or volume control valve 70 which thereby controls the feed movement of the tool 43 across the surface of the workpiece 64. By moving the handle 59 in a counter-clockwise direction beyond neutral position the slide is returned to initial position at high speed. This action is produced by reversing the flow of fluid on opposite sides of the piston 23 by the passageways 84 and 85 of the valve 27.

The head is indexed to have the tool 44 aligned with the workpiece and the valve handle 59 is returned to neutral position. Thereafter, the valve handles 58 and 59 are again operated in a clockwise direction to produce the high speed movement of the slide 21 by delivering the pressure from the pump 15 through the passageway 82 of the valve 26 to the left hand side of the piston 23 from the conduits 72 and 71. Fluid on the opposite side of the piston is returned to the tank 14 through conduits 74 and 73 and passageway 83 of the valve. This movement advances the tool within the workpiece and through the engagement of the cam 36 with the roller 37 on the valve 28, which moves the valve portion 86 downwardly against the spring 87 and initiates the flow of fluid to the right hand end of the piston 57, the abrasive elements are expanded into contact with the surface of the workpiece. During advancement, the plunger 39 is engaged by the end 41 of the cam and moved therewith to operate the valve 38 and reverse the flow of fluid in the cylinder 22 at the end of the forward movement of the honing tool. The valve 38 embodies a rotor 75 having bridging ports 76, 77, and 78, and provided with cam surfaces 79 and 80 which are operated by a pin 81 projecting from one side of the plunger 39 which is prevented from rotating. The ports 76 and 77 bridge the conduits 71 and 72, and 73 and 74, respectively, to produce the operation above described. When the plunger 39 approaches the end of its movement to the left, the pin 81 contacts the cam surface 79 and rotates the rotor 75 to have the port 77 connect the conduits 72 and 74 while the port 78 connects the conduits 71 and 73. The fluid pressure through the passageway 82 of the valve 26 and the conduit 72 is delivered to the right hand side of the piston 23 through the conduit 74. Fluid on the left hand side of the piston 23 is returned to the tank 14 through the conduits 71 and 73 and the passageway 83 of the valve 26. The cylinder 22 is then moved to the right, moving the cam 36 along therewith, permitting the plunger 39 to also move to the right under the bias of the spring provided thereabout. Near the end of the movement of the plunger 39 to the right the pin 81 engages the cam surface 80 to rotate the rotor 75 in the reverse direction to again have the ports 76 and 77 bridge the conduits 71 and 72 and 73 and 74 respectively. This reverses the flow of fluid on each side of the piston 23 and moves the cylinder 22 again to the left. While I have illustrated the valve 38 and cam 36 of a predetermined length, it is to be understood that any length of valve and cam may be provided to vary the length of the stroke of the cylinder 22. The present structure is employed for workpieces of small length where the stroke in reciprocation is small, and for workpieces of greater length the length of the stroke in reciprocation may be materially increased. When the operating handle 59 is moved counter-clockwise, pressure from the conduit 71 in one position of the rotor 75 will be returned to the tank while pressure from the conduit 74 in the other position of the rotor will also be delivered to the right hand end of the piston 23. Pressure will be delivered through the passageway 84 of the valve 27 to the right hand side of the piston 23 which will return the cylinder 22 and slide to its initial position and interrupt the operation.

Thereupon the head 32 is again indexed to move the finishing tool 46 in to position of alignment with the workpiece 64, at which time the handle 58 is again operated to produce the advancement of the slide and thereafter the reciprocating movement of the honing tool within the workpiece as above described. After the finishing operation the handle 58 is returned to its neutral position and the slide 21 again moves to its initial position and the operation interrupted. The workpiece 64 is released from the chuck 65 and is machined to an accurate diameter with a highly polished surface.

As pointed out hereinabove, the machine has been illustrated as operating on the interior cylindrical surface of a workpiece 64 and it is within the purview of my invention to provide external tools and a chuck which exposes the external cylindrical surface to be machined by the tools. The external tools would function and be controlled in the same manner as above specified for the internal tools and in this manner external and internal cylindrical surfaces of the workpiece may be rough and finished machined with a single clamping of the workpiece. While I have specifically recited a boring tool and two honing tools, it is to be understood that reaming, coining, drilling, and other tools may be employed in conjunction with the honing tools herein illustrated and described.

While I have described and illustrated but a single embodiment of my invention, it will be apparent to those skilled in the art that various changes, omissions, additions, and substitutions may be made without departing from the spirit and scope of my invention, as set forth in the accompanying claims.

What I claim is:

1. A metal working machine including, in combination, a base, a support for a workpiece, means for rotating said support, a turret head, a cylinder boring metal cutting tool and a honing tool having expansible abrasive stones mounted on said head, means for feeding said head toward said workpiece, means for slowly feeding the metal working tool across the workpiece, means for reciprocating the honing tool thereafter across the machined surface of the workpiece, and means operated during the initial advancement of said honing tool within the workpiece for producing the expansion of the stones thereof.

2. A metal working machine including in combination, a base, a slide on said base, a fluid device for producing movement in reciprocation to said slide, a head on said slide having a plurality of tools thereon adjustable to align the axes of the tools with that of a workpiece, a support for the workpiece, means for rotating said support and workpiece, control means for the fluid device for rapidly advancing the slide until the tool is in machining position, after which a feed movement is provided thereto for machining the workpiece surface, one of said tools being an expansible honing tool movable into aligned relation with the work means for expanding the abrasive stones of the tool against the surface of the workpiece, and means engaged by the slide during said advancement to produce the reciprocation of the honing tool within the working range of the workpiece.

3. The method of machining the cylindrical surface of a workpiece which includes the steps, of rotating the workpiece, of advancing a cutting tool into position to machine the interior surface of said workpiece, thereafter slowly feeding said cutting tool across the inner surface of the workpiece to produce the rough cutting operation, thereafter advancing a honing tool in position to machine the inner surface of the workpiece, moving the abrasive elements of the honing tool into engagement with surface, reciprocating the honing tool within the length of said surface, advancing another honing tool thereafter in position to machine the workpiece, moving the abrasive stones thereof into engagement with the surface of the workpiece and reciprocating the tool within the length of said surface to produce the finish honing of the surface thereof, all of said operations occurring during the time the workpiece is rotated.

JOHN E. KLINE.